United States Patent [19]

Childers et al.

[11] 3,935,148

[45] Jan. 27, 1976

[54] RECOVERY AND RECYCLE OF LATEX PRODUCED IN USED AQUEOUS SUSPENSION MEDIUM

[75] Inventors: Clifford W. Childers; Earl Clark, both of, Bartlesville, Okla.

[73] Assignee: Phillips Petroleum Company, Bartlesville, Okla.

[22] Filed: Dec. 5, 1972

[21] Appl. No.: 312,331

[52] U.S. Cl. .................. 260/29.6 XA; 260/29.6 RB; 260/29.7 UP; 260/85.5 R; 260/85.5 A; 260/85.5 AW; 260/85.5 S; 260/92.8 A; 260/92.8 W; 260/93.5 R; 260/93.5 A; 260/94.9 F; 260/95 C; 260/880 R; 260/880 B
[51] Int. Cl.² ..................... C08L 9/00; C08L 47/00; C08F 220/42; C08F 110/02
[58] Field of Search ......... 260/880 R, 93.5, 92.8 W, 260/880 B, 89.5 A, 89.5 AW, 85.5 S, 85.5 R, 92.8 A, 93.5 A, 94.9 F, 95 C, 29.7 UP, 29.6 RB, 29.6 XA

[56] References Cited
UNITED STATES PATENTS

| | | | |
|---|---|---|---|
| 2,802,808 | 7/1957 | Hayes | 260/880 R |
| 2,948,703 | 7/1960 | Schroeder | 260/893 |
| 3,458,602 | 7/1969 | Pollock | 260/880 R |
| 3,509,238 | 4/1970 | Aubrey et al. | 260/876 R |
| 3,515,692 | 6/1970 | Carrock | 260/880 R |
| 3,531,548 | 9/1970 | Goldberg | 260/880 R |
| 3,644,587 | 2/1972 | Finberg | 260/880 R |
| 3,663,656 | 5/1972 | Ford et al. | 260/29.7 UP |

*Primary Examiner*—Joseph L. Schofer
*Assistant Examiner*—Herbert J. Lilling

[57] ABSTRACT

Unreacted monomer in the water phase resulting from a suspension polymerization is polymerized to form a latex, as by the addition of an initiator to the water phase, in continued presence of the organic phase, thus removing from the organic phase, and therefore from the product, unreacted monomer into the water phase and therein also polymerizing the so removed monomer. The latex so obtained is recycled to the system as at least a portion of the aqueous phase for an ensuing polymerizable formulation. The polymer in the recycled latex becomes incorporated in the polymer generated in said ensuing polymerization. The invention is especially suited to the suspension process for producing ABS type products, affording considerably improved and simplified separation of unreacted monomer from the polymer product and conversion of said unreacted monomer to additional polymer avoiding expensive monomer recovery systems.

9 Claims, No Drawings

RECOVERY AND RECYCLE OF LATEX PRODUCED IN USED AQUEOUS SUSPENSION MEDIUM

This invention relates to the production of polymers. In one of its aspects, the invention relates to a suspension polymerization operation in which organic monomers are polymerized in an aqueous suspension polymerization system. In a specific aspect, the invention is concerned with the separation of unreacted monomers from polymer formed in a suspension polymerization system. In another specific aspect, the invention is directed to economical recovery and use of said monomers.

In one of its concepts, the invention provides a process for the production of polymers in an aqueous suspension polymerization system wherein unreacted monomer resulting upon self-termination of the principal polymerization is polymerized in the aqueous phase in presence of the originally formed polymer product forming a latex which is then used in an ensuing polymerization step. In another of its concepts, the invention provides such a process in which a water-soluble initiator is added to promote the formation of the polymer latex.

In the production of ABS type polymers employing acrylonitrile and styrene in aqueous suspension systems, the polymerizations characteristically terminate spontaneously with about 5 to 20 percent of the monomer remaining unreacted. (The term "ABS" can be defined as that family of graft copolymers which is formed by polymerizing acrylonitrile with styrene in the presence of a butadiene-containing polymer.) The unreacted monomer is found partially in the aqueous phase but mainly is in the organic phase. Prior to this invention the unreacted monomer in the organic phase has presented a difficult separation problem in product purification and also a loss of monomer through incomplete conversion. Recovery of the portion of the monomer present in the organic phase through recycle is an expensive, multistep process although the portion of the monomer in the aqueous phase might be recycled simply by recycling the aqueous phase as such.

We have conceived that converting the monomer in the aqueous phase or suspension medium to a latex before removal of the product-containing organic phase will cause diffusion from the organic phase to the aqueous phase of additional unreacted monomer which is then polymerized to form additional latex. This latex-containing suspension medium is then separated and recycled or otherwise used as part of an aqueous phase for further polymerization wherein the polymer content of the latex will be absorbed in a subsequently employed organic phase. This process obviates the problem of separating the unreacted monomer from the polymer and prevents the loss of this monomer without requiring expensive monomer recovery steps.

It is an object of this invention to provide a process for the production of polymers. It is another object of this invention to provide a process for the suspension polymerization of monomers. It is a further object of this invention to provide a polymerization process in which the unconverted monomer is a polymer product is recovered. A still further object of the invention is to provide a process in which expensive recovery of unreacted monomer present in a polymer product is avoided.

Other aspects, objects and the several advantages of the invention are apparent from a study of this disclosure and the appended claims.

According to the present invention, unreacted monomer in the aqueous phase and in the polymer product resulting from a suspension polymerization is converted to a polymer latex with a subsequent recycling of the latex as at least a portion of the aqueous phase present in a following polymerization formulation, the conversion of polymerization of the unreacted monomer being effected in the aqueous phase into which unreacted monomer, with polymer in the organic phase, is drawn as polymerization in the aqueous phase ensues. The polymer contained in the recycled latex is thusly imbibed in the monomer phase of said following polymerization formulation and contributes to the polymer produced. Also according to the present invention batch-wise operation is now preferred as later described because it yields a clear serum on polymerization reducing virtually completely all loss of monomer in the serum.

A water-soluble initiator can be added to the aqueous phase to promote the formation of the polymer latex in this process.

The invention prevents the loss of monomer, obviates complex monomer separation and recovery operations and therefore increase yields while actually reducing operation costs and yielding a readily obtained, improved product polymer.

The process is especially applicable to the production of ABS type resins. The invention is also applicable, broadly, to other monomers that can polymerize under suspension conditions, e.g., styrene, vinyl chloride, methyl methacrylate, and the like.

Indeed, the present invention is widely applicable as one skilled in the art having possession of this disclosure and having studied the same will realize.

In view of the wide applicability of the invention, it will be undersstood that the products made in accordance with the instant invention will have a wide range of end uses, e.g., as containers, housewares, pipes, appliance cabinets, and the like. The properties of the products of the present invention are not significantly or appreciably different from those made without its application in the formation of said products.

The process of the invention will be described primarily by its application to ABS systems in which an unsaturated elastomer is dissolved in at least one vinylidene group containing monomer to form a solution, preferably in at least two such monomers of which one is a nitrile. The rubber-in-monomer solution or cement thus obtained is then suspended in water and polymerized with a free radical generating initiator such as peroxy compound or an azo compound preferably under conditions such that the elastomeric content is maintained essentially gel-free. After the polymerization reaction has been effected to a desired extent or has stopped as herein discussed, the monomer present in the water phase is polymerized to form a latex, preferably while all of the polymer product, which has just been produced, remains therein. This polymerization to form a latex is facilitated through the use of added water-soluble initiators with the result that said monomer is better converted to polymer latex. It is latex, formed as described, which is used in an ensuing reaction to produce additional product, when, according to the invention, the suspension medium is used in an ensuing polymerization. This latex contains not only the now polymerized, unreacted monomer of the aqueous phase, but also that the polymer product in the organic phase.

The unsaturated elastomers which are applicable can be characterized as those rubbery polymers having at least enough unsaturation to be vulcanizable. The unsaturated elastomers include both natural rubbers and synthetic polymers. The polymers include polymers sof conjugated dienes such as those containing 4 to 12 carbon atoms per molecule, preferably those of 4 to 8 carbon atoms per molecule. Examples of these monomers are: 1,3-butadiene, isoprene, piperylene, 2,3-dimethyl-1,3-butadiene, 1,3-octadiene, 4,5-diethyl-1,3-octadiene, and the like. These conjugated dienes can be polymerized to form homopolymers or copolymerized one with another. Conjugated diene polymers as a class also include copolymers formed by polymerizing one or more conjugated dienes with one or more copolymerizable monovinyl-substituted aromatic compounds or monomers, such as those of 8 to 20, preferably 8 to 12, carbon atoms per molecule, including styrene, various of the alkyl styrenes, such as ethyl styrene, halostyrenes such as 2,3-dichlorostryrene; and other such polymerizable ethylenically unsaturated monomers such as the nitriles such as acrylonitrile and methacrylonitrile. Exemplary of the unsaturated elastomers are cis-polybutadiene, emulsion polybutadiene, vinyl polybutadiene, cis-polyisoprene, natural rubber, GRS rubber, butadiene/styrene copolymers of both random and block monomer distribution emulsion or solution polymerized, butadiene/acrylonitrile copolymers, ethylene/propylene/diene terpolymers (EPDM), partially hydrogenated polybutadiene or butadiene/styrene copolymers, and the like. Two or more unsaturated vulcanizable rubbers can be used, if desired, in forming the rubber-in-monomer cement.

The vinylidene group containing monomers where are applicable include those which are polymerizable in the presence of the above-described elastomers can be at least partially grafted to at least one elastomer dissolved in a monomer. Thus, the vinylidene group containing monomers include vinyl-substituted aromatic compounds, alpha,beta-unsaturated nitriles, esters of acrylic acid, esters of alkacylic acid, and vinyl esters such as vinyl acetate, vinyl butyrate, and the like. The number of carbon atoms per molecule can range from 3 to about 30 carbon atoms per monomer molecule, presently preferred are monomers having up to 18 carbon atoms per molecule, more preferably up to about 12 carbon atoms per molecule. These monomers include, for example, the presently preferred styrene, acrylonitrile, and methacrylonitrile; as well as alpha-methylstyrene, methylmethacrylate, 4-vinylbiphenyl, 2-vinylnaphthalene, and the like. Another group of useful monomers are the maleninimides, olefinically unsaturated heterocyclic compounds polymerizable through the olefinic unsaturation. Any related monomer such as the dialkyl maleates or fumarates also is useful within the context of our invention. Mixture of monomers can be employed. In this invention, the unsaturated elastomer is dissolved in the vinylidene group containing monomer or monomers. The amount of elastomer so dissolved can be of any broad range suitable or desired depending on the particular elastomer or monomer characteristics. For commercial convenience in handling in suspension polymerization processes, a range of about 5 to 40 percent by weight based on the combined weight of elastomer and monomers presently is considered most convenient. Presently preferred are the use of mixtures of monomers wherein a vinylidene nitrile-containing monomer is one component thereof and constitutes in admixture up to about 95 weight percent of the monomer mixture. Especially useful products are obtained by the use of styrene/acrylonitrile mixtures containing up to about 50, preferably about 20 to 40, parts by weight of acrylonitrile per 100 parts of monomer mixture.

The rubber-in-monomer solution or cement is placed in a suspension polymerization system with water as the continuous phase. The solution of elastomer in the grafting monomer is stirred in the suspension system in the presence of polymerization initiators, water, suspending agents, and, where desired, additionally with molecular weight regulators, all as known in the art.

Although the polymerization reaction may proceed thermally, it is preferable to incorporate a free-radical generating initiator. Initiators useful in the context of this invention include the monomer-soluble organic peroxides and the azo compounds, examples of which include monomer-soluble di-t-butylperoxide, benzoyl peroxide, oleyl peroxide, toluyl peroxide, t-butyl peracetate, t-butyl perbenzoate, dicumyl peroxide, t-butyl peroxide, 2,5-dimethyl-2,5-di(t-butylpheroxy)hexane, 2,5-dimethyl-2,5-di(t-butylperoxy)-hexyne-3, t-butyl hydroperoxide, cumene hydroperoxide, p-menthane hydroperoxide, cyclopentane hydroperoxide, diisopropylbenzenne hydroperoxide, p-t-butylcumene hydroperiode, pinene hydroperoxide, 2,5-dimethylhexane-2,5-dihydroperoxide, and the like, and mixtures thereof, as well as any of the monomer-soluble azo initiators useful in suspension polymerization systems, such as 2,2'-azobis[2-methylpropionitrile], and the like.

Suspending agents employed include finely divided inorganic solids such as titanium dioxide, tricalcium phosphate, and the like, which can be formed separately and added to the suspension system, or preferably can be formed in situ for most effective and useful results as a most uniformly finely divided suspending agent.

Water-soluble initiators can be employed to facilitate conversion to polymer latex of the monomers present in the aqueous phase. Examples of such include oxygen, hydrogen peroxide, 2,2'-azobis[2-methylpropioamidine] hydrochloride, persulfate/bisulfite or sulfite or thiosulfate couples (e.g., potassium persulfate/sodium bisulfite, sodium persulfate/sodium sulfite, ammonium persulfate/potassium thiosulfate), metal ion/peroxide systems (e.g., ferrous ion/hydrogen peroxide), and the like.

Chain transfer agents can be added, if desired, to the polymerization mixture for molecular weight control of the polymer. Chain transfer agents include the normal or tertiary alkyl mercaptans having from 4 to 16 carbon atoms per molecule such as t-dodecyl mercaptan and n-dodecyl mercaptan. Other useful agents include other mercaptans, the lower alkyl xanthogens, such as diisopropyl xanthogen; alpha-bromoethylbenzene; alpha-chloroethylbenzene; carbon tetrabromide; alpha-methylstyrene dimer; and the like. Such modifiers can be added in an amount sufficient for effect desired and typically in about 0.4 to 1.5 weight percent of the monomer-elastomer.

The amount of water employed in the suspenion polmerization can vary widely depending on the reactor employed, agitation means, and the like. It is presently preferred to employ sufficient water such that the final suspension mixture contains from about 20 to 60 percent by weight of monomer-elastomer based on the total weight of the entire mixture including water. The time employed for polymerization is that sufficient for the conversion desired, and can vary over a wide range. Time varies, depending on other reaction parameters such as on the temperature chosen, and can range from a very few minutes to such as 48 hours or more, preferably from 2 to 16 hours. The temperature employed in the suspension polymerization is at least sufficient to induce decomposition of the free radical initiator, and preferably below that which would cause gel formation in the elastomeric component. A suitable temperature range is from about 50° to about 150°C.

Ranges of time and temperature for use of water soluble initiators in accordance with out invention are: 30°–150°C and 5 minutes-48 hours; preferably 50°–120°C and 15 minutes-1 hour, respectively.

At the end of the suspension polymerization reaction, stirring is ceased, and the polymeric product in the form of small beads is allowed to settle. Water washing is normally employed to separate the beads from the polymer latex/water phase. Water washing is not a necessity, however, it is preferable to remove the minor amounts of calcium phosphate or other suspending agent present and any residual amounts of polymer latex by water washing the beads before drying.

Polymer stabilizers, e.g., antioxidants, can be added either before or after polymerization. The polymers can be compounded with a wide variety of fillers, plasticizers, pigments, reinforcing fibers, and the like for various purposes.

EXAMPLE I

A control run was made in which a polymer latex was generated. The latex was not recycled. The run was made under simulated adiabatic conditions to approximate plant reactor conditions. The latex here discussed is that extant after the product resin or polymer has been removed from the suspension medium.

A commercially available butandiene/styrene rubbery block copolymer was dissolved in a mixture of styrene and acrylonitrile and polymerization was carried out under suspension polymerization conditions.

PREPARATION OF POLYMER SOLUTION (A):

| | Parts by Weight |
|---|---|
| Butadiene/styrene 75/25 block copolymer[a] | 15 |
| Styrene/acrylonitrile 70/30 | 85 |
| Sulfole 120*[b] | 0.5 |
| t-Butyl peroctoate | 0.4 |
| Dicumyl peroxide | 0.1 |
| 2,6-Di-t-butyl-4-methylphenol | 0.2 |
| Tris(nonylphenyl) phosphite | 0.46 |
| Dilaurylthiodipropionate | 0.33 |

[a] A butadiene/styrene (75/25) block copolymer having about 18 percent block polystyrene and a Mooney viscosity ML-4 at 212°F ASTM D 1646-63 of about 47, commercially available as Solprene* 1205 from Phillips Petroleum Company.
[b] t-Dodecyl mercaptan available from Phillips Petroleum Company.
*Trademark

PREPARATION OF SUSPENSION AGENT DISPERSION (B):

| | Parts by Weight |
|---|---|
| Water | 100 |
| Phosphoric acid (85%) | 0.744 |
| Calcium hydroxide | 0.738 |
| Cascoloid ST-56[a] | 0.01 |

[a] A casein derivative (Borden Chemical Co.)
*Trademark

In accordance with the above recipes, polymer solution (A) was made by adding the solid polymer cut into small pieces to the styrene/acrylonitrile mixture and allowing the combination to stand until the polymer dissolved. The other ingredients of the polymer solution were then added. In making up the suspension agent dispersion (B), phosphoric acid was added at room temperature in dilute solution to a stirred suspension of calcium hydroxide and then Cascoloid ST-56 was added.

For the polymerization, 612 g of the polymer solution (A) and 609 g of the suspension agent dispersion (B) were combined and agitated at 80°C for 0.5 hours. The polymerization temperature was then progressively raised by 10°C increments each 0.5 hour, to simulate adiabatic type operation at plant scale, such that the time/temperature relationship was 0.5 hour/80°C, 0.5 hour/90°C, 0.5 hour/100°C, 0.5 hour/110°/C, and 0.083 hour/120°C. At this point, according to the present invention, potassium persulfate (2.16 g) and sodium bisulfite (0.06 g) were added and the polymerization was continued at 120°C for an additional 0.5 hour.

This additional half-hour polymerized the unreacted monomer in the aqueous phase and unreacted monomer coming from the oil or organic phase into the aqeuous phase as monomer in the aqueous phase polymerized.

The polymer beads were separated from the polymer latex and washed combining the washings with the latex to result in about 4 liters of an approximately one percent solids polymer latex.

This four liters of latex now contained as said one percent solids, solids resulting from the polymerization of the unreacted monomer in the aqueous and organic phases in presence of each other, according to the invention.

The yield of polymer in bead form was 548.5 g. (87.7 percent conversion).

EXAMPLE II

Four relates runs, made under isothermal conditions, employed a polymer solution (A) made in accordance with the polymer solution recipe of Example I. The suspension agent dispersion (B) was made up according to the following recipe following the procedure given above in Example I.

PREPARATION OF SUSPENSION AGENT DISPERSION (B):

| | Parts by Weight |
|---|---|
| Water | 300 |
| Phosphoric acid (85%) | 1.488 |
| Calcium hydroxide | 1.476 |
| Cascoloid ST-56[a] | 0.02 |

[a] A casein derivative (Borden Chemical Co.).

Four comparative runs, 1, 2, 3, and 4, were conducted. In each the reaction mass was agitated at about 80°C for 8 hours in a batch reactor. In each there was added to the reactor 52 grams of polymer solution (A) of Example I, and 75.75 g (75 ml) of suspension agent dispersion (B), together with 75 ml of the latex produced in Example I (Run 1) and various mixtures of this latex and water (Runs 2 and 3), and no latex but only water (Run 4).

TABLE I

| Run | Latex, ml. | Water, ml. | Polymer Recovered, g. | Effective Conversion, %* |
|---|---|---|---|---|
| 1 | 75 | 0.0 | 48.6 | 91.3 |
| 2 | 37.5 | 37.5 | 48.1 | 91.1 |
| 3 | 12.5 | 62.5 | 47.5 | 90.4 |
| 4 | 0.0 | 75 | 45.5 | 86.0 |

*These values are the sum of the contributions from the polymer solution and from the latex that was charged.

Run 4 (86.0% conversion) and Example I (87.7% conversion) are control runs made without the inventive benefit of recycled polymer latex. Run 1 (91.3% conversion) reflects the benefit in improved conversion that accrues from the invention.

It is readily apparent from the above cited effective conversion values that the utilization of monomer is significantly improved by converting monomer in the water containing phase to a latex with the recovery of the polymer from that latex through recycling it to a subsequent run.

One skilled in the art can supply the particular elastomer, monomer, suspension medium, conditions including time, temperatures proportions and other physical conditions, as well as catalyst or other chemical conditions for the formation of the primary product as well as the formation of the latex which, according to this invention, is used as at least a part of an ensuing polymerization suspension medium.

The process of the invention can be carried out on either a batch or a continuous basis. A continuous operation can be conducted wherein flow conditions are maintained such that, downstream of the zone in which polymerization occurs in the organic phase, a water soluble initiator is introduced. The result is the formation of a polymer latex as discussed above. Further downstream a separation is made, as by filtration, to divide the polymer beads from the polymer latex with subsequent recycle of said polymer latex for use as at least a part of the aqueous phase charged upstream of the aforementioned zone wherein occurs polymerization in the organic phase.

In the prior art monomer can be recovered from the polymer in two basic ways, steam distillation of polymer beads added to water and applying reduced pressure to molten polymer. This is a progressive time-consuming process since monomer in the beads must migrate therefrom into the water phase before it will be steam distilled when steam distilling is employed. Depending on the bead sizes and other conditions these procedures can require, say, an hour and even much more time, especially if good recovery of monomer is desired. Clearly, when vacuum distilling is employed as when passing molten polymer through a reduced pressure zone in an extruder, essentially the procedure is one of vacuum drying and this, too, is time-consuming and quite costly.

Alternatively, in the prior art, the monomer in the water phase is polymerized with the subsequent removal of resulting polymer as by filtration and the remaining water is then recycled. In operations in which the monomer is removed as such from the water phase, said monomer can be recycled but only after expensive purification necessitated by the usual event that impurities have become included into said recovered monomer.

The present invention obviates much, if not all, of this expenditure of time and money.

The initiator used to polymerize the unreacted monomer in the aqueous phase can be any material or agent which will cause the polymerization to occur. Such initiator, if a substance, normally or usually will not be readily soluble in the organic phase and will be different from that used in the original polymerization.

Reasonable variation and modification are possible within the scope of the foregoing disclosure and the appended claims to the invention, the essence of which is that in a suspension polymerization, as herein described, desirable material and/or monomer is recovered by subjecting the aqueous suspension medium to polymerization conditions to form in said medium a polymer latex, preferably in the presence of the original polymer product, whereupon the medium is used at least in part in an ensuing polymerization to form additional primary or desired product.

We claim:

1. In the aqueous suspension graft polymerization in which at least one unsaturated elastomer and at least one vinylidene group containing monomer are reacted to form a polymerization product mixture comprising a graft polymer phase and an aqueous phase, the improvement comprising converting the unreacted monomers remaining in either phase after the suspension polymerization is complete to a polymer latex by adding to said product mixture a water-soluble polymerization initiator, then subjecting said product mixture to polymerization conditions which will cause the unreacted monomers to polymerize in the aqueous phase in response to said initiator to form a latex, separating the polymer latex from the graft polymer phase, the reaction conditons employed in both the suspension polymerization and the polymerization of the unreacted monomers being selected to that substantial amounts of gel are not formed, and using the polymer latex as at least a portion of the suspension medium for an ensuing aqueous suspension graft polymerization in which at least one unsataurated elastomer is grafted with at least one vinylidene group containing monomer.

2. A process according to claim 1 wherein the resulting polymer latex is recycled to the original polymerization zone for said ensuing polymerization.

3. A process according to claim 1 wherein an ABS type polymer is being produced in the original polymerization.

4. A process according to claim 1 wherein the ensuing polymerization is conducted batchwise.

5. The process of claim 1 wherein a monomer soluble initiator is used in forming the graft polymer phase.

6. The process of claim 1 wherein the water soluble initiator is a persulfate bisulfite couple.

7. The process according to claim 1 wherein the aqueous suspension is butadiene/styrene rubbery block copolymer dissolved in styrene and acrylonitrile.

8. The process according to claim 1 wherein the monomers used in the ensuing aqueous suspension graft polymerization are identical to those used in the initial graft polymerization.

9. In the aqueous suspension graft polymerization in which at least one unsaturated elastomer and at least one vinylidene group containing monomer are reacted to form a polymerization product mixture comprising a graft polymer phase and an aqueous phase, the method of removing the unreacted monomer remaining in the graft polymer after the suspension polymerization is complete comprising adding to said product mixture a water-soluble polymerization initiator, and then subjecting said product mixture to polymerization conditions which will cause the unreacted monomers to polymerize in the aqueous phase sin response to said intiator to form a latex the reaction conditions employed in both the suspension polymerization and the polymerization of the unreacted monomers being selected so that substantial amounts of gel are not formed.

* * * * *